United States Patent [19]
Rieger et al.

[11] Patent Number: 5,434,875
[45] Date of Patent: Jul. 18, 1995

[54] LOW COST, HIGH AVERAGE POWER, HIGH BRIGHTNESS SOLID STATE LASER

[75] Inventors: Harry Rieger; Henry Shields, both of San Diego; Richard M. Foster, Manhattan Beach, all of Calif.

[73] Assignee: Tamar Technology Co., San Diego, Calif.

[21] Appl. No.: 295,283

[22] Filed: Aug. 24, 1994

[51] Int. Cl.⁶ .............................................. H01S 3/10
[52] U.S. Cl. ..................................... 372/25; 372/18; 372/12; 372/13; 372/22; 372/30; 372/31; 372/70
[58] Field of Search .................... 372/25, 18, 5, 12, 13, 372/22, 30, 31, 70, 75, 69

[56] References Cited
U.S. PATENT DOCUMENTS
5,003,543  3/1991  Morsell .
5,235,606  8/1993  Mouroll et al. ....................... 372/25

OTHER PUBLICATIONS
Xenakis et al., Laser-plasma x-ray generator using an injection-mode-locked-XeCl excimer Laser, 1 Jan. 1992.

*Primary Examiner*—Leon Scott, Jr.
*Attorney, Agent, or Firm*—John R. Ross

[57] ABSTRACT

A high average power, high brightness solid state laser system. A laser produces a first pulse laser beam with a high pulse frequency. A pulse spacing selector removes from the first pulse laser beam more than 80 percent of the pulses to produce a second pulse laser beam having a series of periodically spaced short pulses in excess of 1,000 pulses per second. A laser amplifier amplifies the second pulse train to produce an amplified pulse laser beam which is focused to produce pulses with brightness levels in excess of $10^{11}$ Watts/cm². A preferred embodiment produces an amplified pulse laser beam having an average power in the range of 1 KW, an average pulse frequency of 12,000 pulses per second with pulses having brightness levels in excess of $10^{14}$ Watts/cm² at a 20 μm diameter spot which is steered rapidly to simulate a larger spot size. These beams are useful in producing X-ray sources for lithography.

As compared with prior art high brightness lasers, we have reduced the pulse duration by about 2 or 3 orders of magnitude, from a few ns to 100 ps or less. We achieve our very high brightness by focusing on a very small spot, but we are able to simulate a much larger spot by very rapidly steering our high average power beam over the area we need.

22 Claims, 4 Drawing Sheets

LOW COST, HIGH AVERAGE POWER, HIGH BRIGHTNESS SOLID STATE LASER

The invention relates to laser systems and in particular to high power, high brightness solid state laser systems.

BACKGROUND OF THE INVENTION

There is a growing need for reliable, economical X-ray sources for X-ray lithography. It is known that X-ray sources can be produced by illuminating certain metals with very high brightness laser pulses. Required brightness levels are in the range of $10^{11}$ to $10^{13}$ W/cm$^2$ for projection lithography and $10^{13}$ to $10^{15}$ W/cm$^2$ for proximity lithography. To meet future commercial lithography needs, average laser power requirements are about 500 Watts for projection and 1000 Watts for proximity. In addition the lithography process needs call for an X-ray spot diameter of about a few 100 $\mu$m. Designing a laser to meet these requirements involves solving several current problems. The first is the correction of aberrations due to thermal distortion and self focusing in the laser rod. This problem is currently being dealt with by utilizing a Stimulating Brillouin Scattering (SBS) cell to remove these aberrations. SBS cell materials perform efficiently for laser pulses of several nanoseconds or greater. For nanosecond laser pulses, the energy needed to achieve the required brightness is 10 to 30 Joules per pulse and the repetition rate needed to achieve the required power is 100 to 30 hertz. This high pulse energy design creates two additional problems. The amount of debris produced by nanosecond pulsed lasers focused on solid targets, when operated at the required brightness and power levels, is unacceptable. (Studies done by Rutherford and CREOL indicate that the debris level from metal targets is related to the pulse duration. The shorter the pulse duration the lower the debris level.) There is a research program underway to reduce debris by using solid xenon as an X-ray target, but it is at a very early stage. The final problem is the cost of the X-ray lithography system. Flash lamp pumped lasers involve high maintenance costs. Maintenance costs can generally be reduced by pumping with diode lasers. Unfortunately, laser diodes required for the 10 joule per pulse 100 Hz lasers costs millions of dollars.

What is needed is a laser system that meets the needs of X-ray lithography to provide 1) high average power and high brightness, 2) low debris levels and 3) low capital and maintenance cost.

SUMMARY OF THE INVENTION

The present invention provides a high average power, high brightness solid state laser system. A laser produces a first pulse laser beam with a high pulse frequency. A pulse spacing selector removes from the first pulse laser beam more than 80 percent of the pulses to produce a second pulse laser beam having a series of periodically spaced short pulses in excess of 1,000 pulses per second. A laser amplifier amplifies the second pulse train to produce an amplified pulse laser beam which is focused to produce pulses with brightness levels in excess of $10^{11}$ Watts/cm$^2$. A preferred embodiment produces an amplified pulse laser beam having an average power in the range of 1 KW, an average pulse frequency of 12,000 pulses per second with pulses having brightness levels in excess of $10^{14}$ Watts/cm$^2$ at a 20 $\mu$m diameter spot which is steered rapidly to simulate a larger spot size. These beams are useful in producing X-ray sources for lithography.

In a preferred embodiment, the laser is pumped by diode arrays operating at a relatively high duty factor in order to minimize the cost of the pump diodes.

As compared with prior art high brightness lasers, we have reduced the pulse duration by about 2 or 3 orders of magnitude, from a few ns to 100 ps or less. We achieve our very high brightness by focusing on a very small spot, but we are able to simulate a much larger spot by very rapidly steering our high average power beam over the area we need.

BRIEF DESCRIPTION OF THE DRAWINGS

FIGS. 1A, 1B and 1C are qualitative representations of the pulse shape at various stages of the embodiment shown in FIG. 1.

DETAILED DESCRIPTION OF PREFERRED EMBODIMENTS

Figure 1:
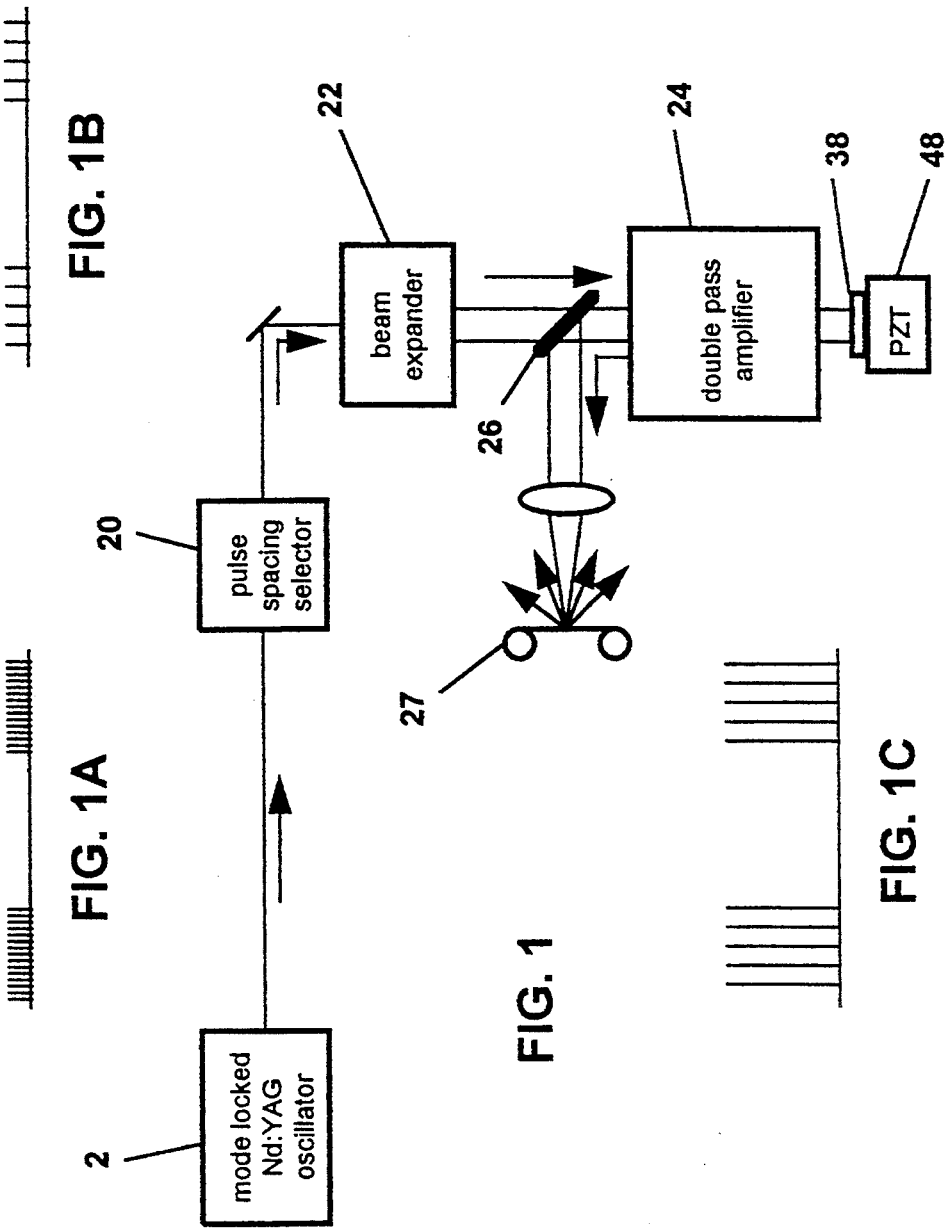
FIG. 1 is a drawing showing the principal features of a preferred embodiment of the present invention for producing high brightness pulse laser beams useful for X-ray lithography.
Figure 2:
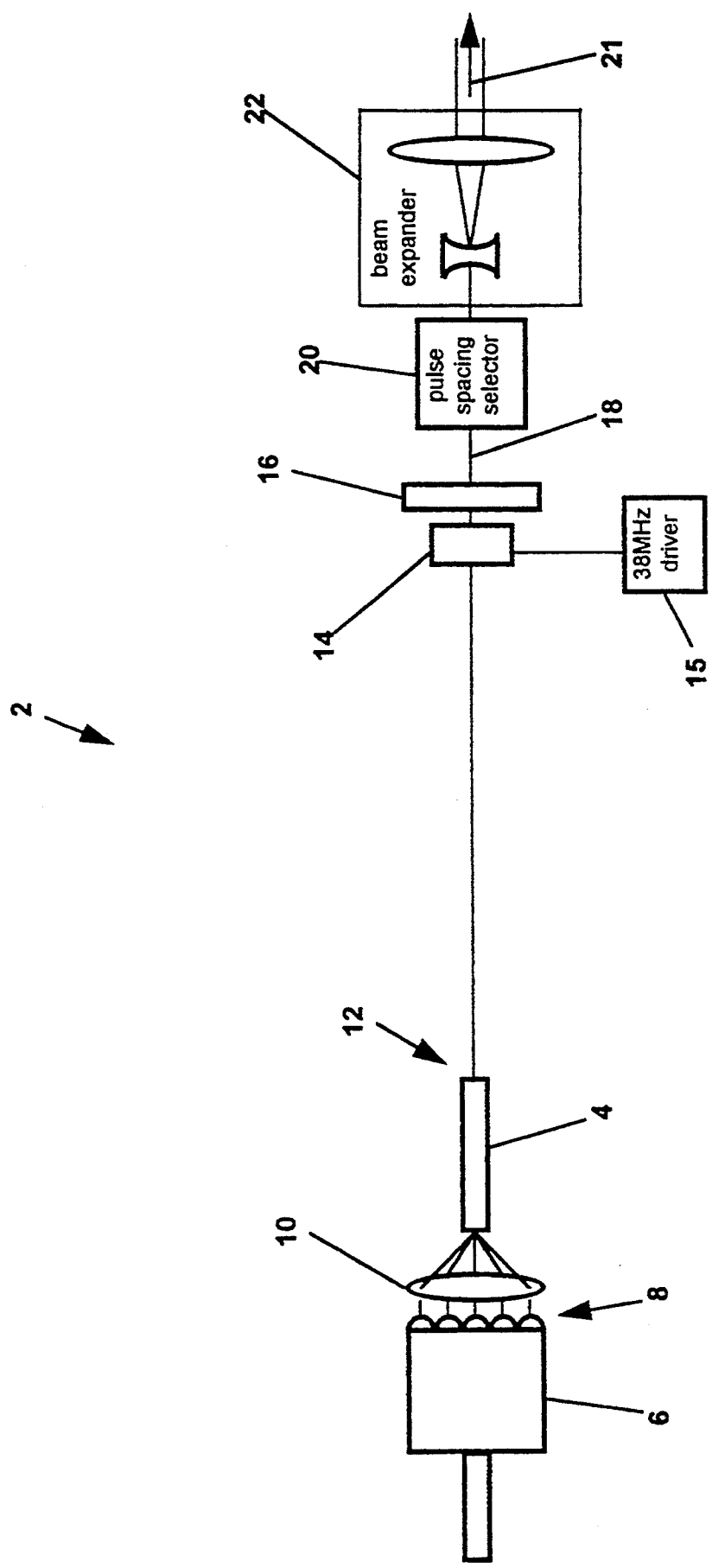
FIG. 2 is a drawing showing in greater detain a first portion of the embodiment of FIG. 1.
Figure 5:
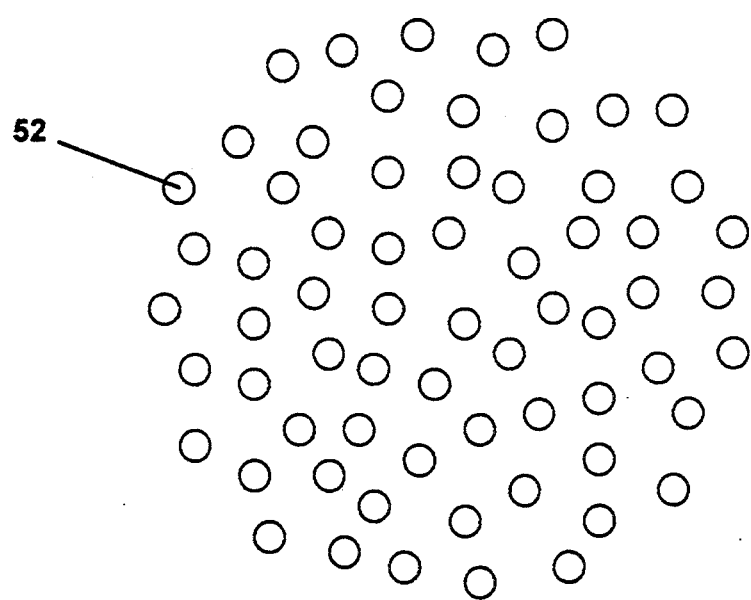
FIG. 5 is a drawing showing a cluster of tightly focused spots.

A preferred embodiment of the present invention can be described by reference to FIGS. 1, 2 and 3. As shown in FIG. 1, this embodiment consists of a mode locked Nd:YAG laser oscillator 2, a pulse spacing selector 20, a beam expander 22, a polarizing beam splitter 26, a double pass amplifier section 24 and a beam steering PZT 48 on which the amplifier folding mirror 38 is mounted. The output of amplifier 24 is focused to a tiny spot on moving copper tape target 27. FIG. 2 describes the seed laser laser section of the embodiment which is for producing very short duration pulses at a very high repetition rate and FIG. 3 describes the amplifying section for amplifying the pulses to produce a pulsed laser beam with an average power level of about 1 kW with pulses at brightness levels in the range of $10^{14}$ W/cm$^2$ on spot sizes of about 20 $\mu$m diameter. And finally, FIG. 5 shows the result of a beam steering mechanism to generate a cluster of few 20 $\mu$m spots 52 over a 500 $\mu$m diameter circular area on a metal target.

SEED LASER

FIG. 2 is a diagram of a Nd:YAG mode locked oscillator type laser device 2. A Nd:YAG polished rod 4 (3 mm diameter and 2.5 cm long) is longitudinally pumped by a 5 bar impingement cooled laser diode array 6 (part number SDL3245-J5). The diode pump array is a quasi-CW at 20 percent duty factor (about 200 $\mu$s ON and 800 $\mu$s OFF) and 50 Watt average. The diode array wavelength is at 808 nm which corresponds to strong absorption in the Nd:YAG. The output of the pump diodes are collimated in the longitudinal axis by an array of cylindrical micro-lenses 8. A fast focusing lens 10 concentrates the pump light at the back end of Nd:YAG crystal 4. The back surface of Nd:YAG crystal 4 has 5 m radius of curvature (convex) and is polished and coated for maximum reflection (about 99.8 percent) at 1064 nm (the lasing wavelength of the Nd:YAG laser) and for at least 85 percent transmission for 808 nm (the pump wavelength). The pump light is trapped in the laser rod via total internal reflection (similar to a fiber optics) for high pumping efficiency. The front surface 12 of the Nd:YAG rod is cut at 2 degrees to avoid parasitic oscillations and AR coated for minimal insertion loses at 1064 nm. A Brewster cut acousto-optic mode locker 14 (Brimrose Corporation of America Model FSML-38-10-BR-1064) is placed next to a partially transmitting mirror 16 (output coupler) to actively force all the longitudinal modes to be in phase each time they pass the mode locker. The RF carrier frequency (f) of the mode locker and the optical length of the laser resonator (L) must relate as follows:

$$f = c/4L$$

where c is the speed of light. In this embodiment, we drive mode locker 14 with a 38 MHz RF driver 15. We provide a cavity length of about 6.5 feet. Thus, a train of mode locked pulses at 76 MHz (due to the standing waves that form in the acousto-optic cell) during the ON time will be obtained. The pulse duration will be about 100 ps with an energy per pulse of about 0.6 $\mu$J. The time interval between pulses during the 200 $\mu$s diode ON periods is about 13 ns. During each ON period we get about 15,200 of these very short pulses. Then we have a dead time of about 800 $\mu$s before the next series of 15,200 short pulses. We have 1,000 of these OFF-ON sequences each second, so the result is an average of about 15,200,000 short 100 ps pulses per second with the pulses coming in clumps of 15,200. A qualitative depiction of this pulse train is shown in FIG. 1A. The rapid series of pulses represent 15,200 pulses each with an energy of about 0.6 $\mu$J per pulse spread over 200 $\mu$s and the space represents an 800 $\mu$s dead time.

PULSE SPACING SELECTOR

As will be explained later, we will amplify each pulse from 0.6 $\mu$J to about 80 mJ; therefore, for an average power of 1 KW we need only 12,000 pulse per seconds. To reduce the frequency of the pulses from 15.2 million per second to 12 thousand per second, we place in the path of beam 18 exiting the seed laser a pulse spacing selector 20 as shown in FIG. 2. Pulse spacing selector 20 consists in this embodiment of an electro-optic modulator such as Model 305 supplied by ConOptics. This unit will function as a fast shutter to pass light from the beam during short intervals (each interval having a duration of about 10 ns) at a frequency of 60,000 Hz. Since the pulses are coming into the selector at 13 ns intervals, the pulse selector (synchronized with the beam) will pass a single pulse through each 10 ns window and block all other pulses. At our frequency of 60,000 Hz, we will therefore have about 12 pulses pass each 200 $\mu$s ON period. Since we have 1,000 of these ON periods each second, we will get about 12,000 pulses per second. Thus, the output of pulse spacing selector 20 is a pulse train consisting of clumps of about 12 pulses (each pulse having a duration of about 100 $\mu$s) spaced over 200 $\mu$s duration and these clumps of short pulses being spaced at intervals of 1,000 per second. This is an average of 12,000 pulses per second. To summarize, the output of pulse spacing selector is as follows:

| | |
|---|---|
| Pulse duration | about 100 ps |
| Energy per pulse | 0.6 $\mu$J |
| Peak power per pulse | 6 kW |
| Average frequency | 12,000 pulses per second |
| Average power | 7.2 mW |
| Beam cross section | 0.07 cm$^2$ |

A qualitative depiction of this pulse train is shown graphically in FIG. 1B. It is essentially the same as the train shown in FIG. 1A except the frequency of the pulses during the ON period has been reduced by a factor of about 1,260.

BEAM EXPANDER

The output of the pulse spacing selector is expanded from a cross section of about 0.07 cm$^2$ to a cross section of about 0.6 cm$^2$ with a 3:1 beam expander 22 as shown in FIG. 2. Beam expander 22 consist of an appropriate combination of lenses or any of several commercially available beam expanders chosen for the 1064 nm Nd:YAG beam. The output of beam expander 22 is directed to amplifier 24 as shown in FIG. 1.

AMPLIFIER

Figure 3:
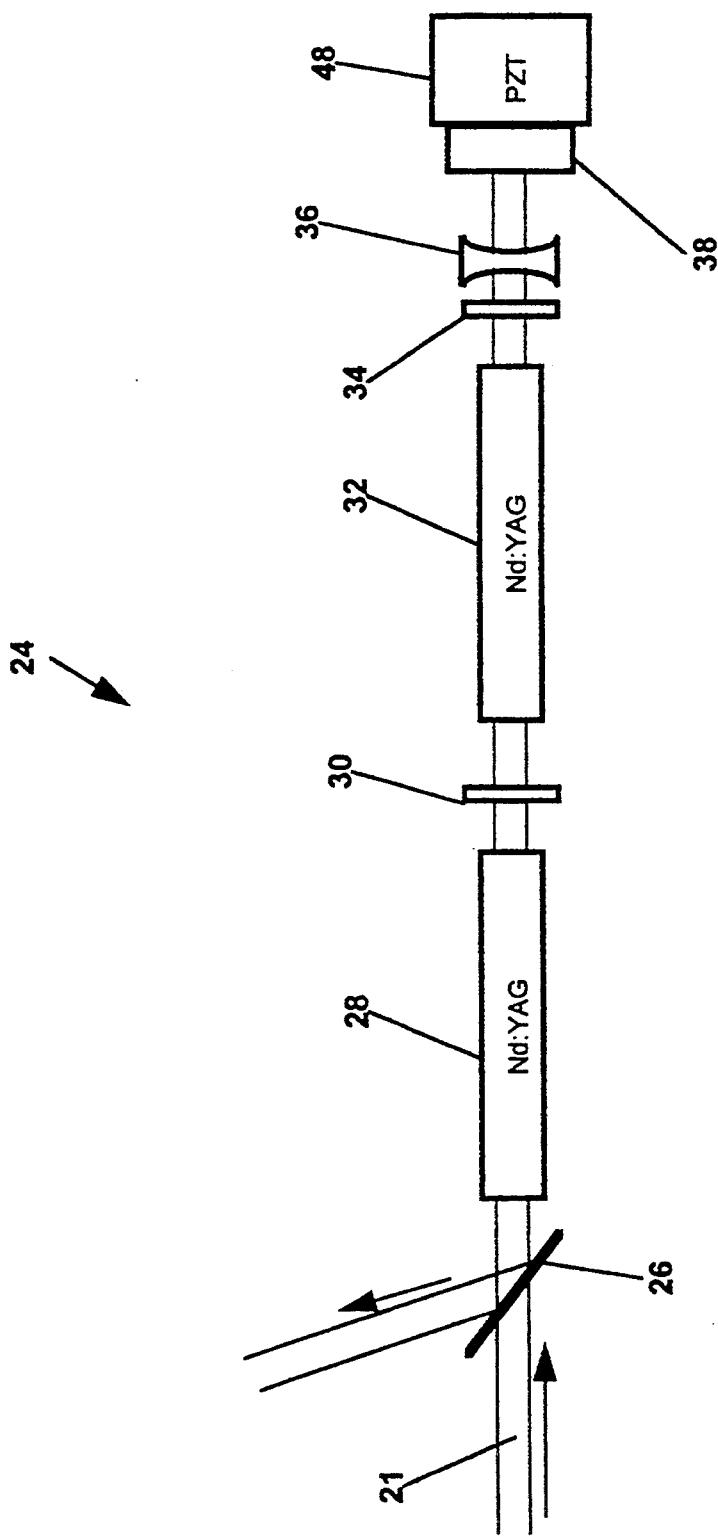
FIG. 3 is a drawing showing in greater detail a second portion of the embodiment shown in FIG. 1.
Figure 4:
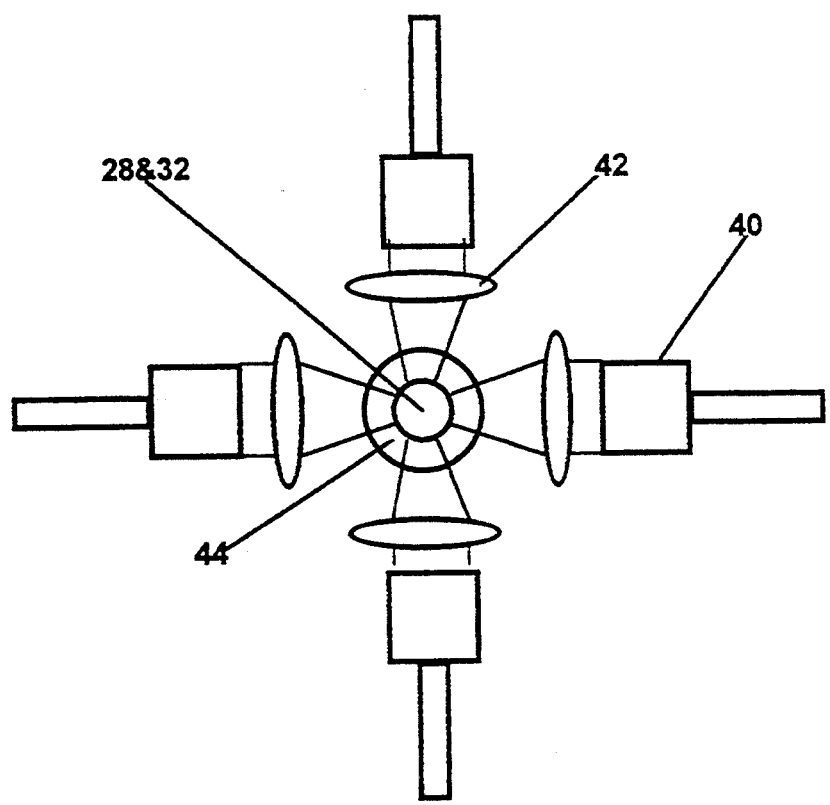
FIG. 4 is a drawing showing the amplifier pumping configuration using laser diodes for the embodiment shown in FIG. 1.

Amplifier 24 for this preferred embodiment is shown if FIG. 1 and in greater detail in FIGS. 3 and 4. FIG. 3 shows the principal features of amplifier other than the amplifier pumping equipment. As shown in FIG. 3, the linearly polarized beam 21 from beam expander passes through a thin film polarizing beam splitter 26 and into a first Nd:YAG amplifier rod 28 then through a one half wavelength rotator 30 (to cancel thermally induced bi-refringence) then through a second Nd:YAG amplifier rod 32 then through quarter wave plate 34 (for shifting the polarization of the outgoing beam by 90 degrees) and corrector lens 36 (for correcting the thermal lensing in the Nd rods) and is reflected off high reflectivity (HR) mirror 38. The beam passes back through the elements of amplifier 24 for two pass amplification and reflected off polarizing beam splitter 26 from which the beam is focused and directed to a metal target 27 as shown in FIG. 1. The amplifier pumping equipment is shown in FIG. 4. This equipment includes 64 modules of 50 Watt per module (nominal) laser diode arrays 40 for a total of about 3 KW average power operating at 808 nm wavelength, 20 percent duty factor (200 $\mu$s ON and 800 $\mu$s OFF). In this embodiment 16 sets are arranged as shown in FIG. 4. The output of the diode lasers are directed into the Nd:YAG rods 28 and 32 with cylindrical lenses 42 and the rods are water cooled by water jacket 44 as shown in FIG. 4.

Amplifier 24 provides a 1.3 $\times$ 10$^5$ amplification of the input beam with good preservation of the input beam (near diffraction limited beam, less than or equal to 2$\times$DL). We focus the beam to a 20 $\mu$m spot on the target. Thus, the output of Amplifier 24 is a pulsed laser beam with the following characteristics:

| | |
|---|---|
| Pulse duration | about 100 ps |
| Energy per pulse | 80 mJ/pulse |
| Peak power per pulse | 800 MW |
| Average frequency | 12,000 pulses per second |
| Average power | 1 kW |
| Beam diameter | 9 mm |
| Brightness (power/ | 2.5 $\times$ 10$^{14}$ Watts/cm$^2$ (20 $\mu$m dia. spot) | pulse)

A qualitative description of the output of the amplifier is shown in FIG. 1C. It is substantially the same as the pulse train shown in FIG. 1B except the pulses are amplified in energy by a factor of about 133,000.

Preferred sizes of the X-ray point source for proximity lithography is in the range of a few 100 μm (e.g., 500 μm) in diameter to about 1 mm in diameter. A 500 μm spot simulated from 20 μm diameter pulses is shown in FIG. 5. In order to achieve the proper spot size with the above described system, we have to hit the target at different spots (e.g., multiple 20 μm spots 52 spread over a 500 μm area 50). This can be accomplished by a mirror mounted on a fast 2 axis PZT 48 that would steer the beam slightly over the required area as shown in FIG. 1.

The above system provides very good X-ray conversion. However, a somewhat better X-ray conversion can be accomplished with higher frequency beams. In a study by Lawrence Livermore laboratories, a 15 percent conversion efficiency was observed when the laser wavelength was 532 nm (doubled 1064 nm) versus 10 percent conversion efficiency for 1064 nm. A doubling crystal can be placed at the output beam from the amplifier in order to utilize the higher X-ray conversion efficiency at 532 nm.

While the above description contains many specificities, the reader should not construe these as limitations on the scope of the invention, but merely as exemplifications of preferred embodiments thereof. Those skilled in the art will envision many other possible variations which are within its scope.

For example, we could choose a much shorter pulse duration than 100 ps. These could be obtained using a passive saturable absorber instead of the acousto-optic mode locker. With a saturable absorber we can get femtosecond pulses. It is our belief that the advantage of pulses in the 100 ps range is that we get some heating of the plasma whereas the very very short pulses creates the plasma but provides very little heating of it. The energy per pulse needs to be in the range of 80 mJ/pulse when the objective lens is about 12 cm from the target. A distance of at least 12 cm is recommended to avoid contaminating the lens with target material. However, if this distance is reduced the required energy per pulse could be reduced accordingly because we could focus on a smaller spot. By doing so we could reduce the energy per pulse requirement from about 80 mJ/pulse to as low as about 10 mJ/pulse.

The cost of laser diodes for pumping solid state lasers is primarily dominated by the peak power requirements and this determines the number of diode bars. By operating the bars at a relatively high duty factor of 20 percent and generating a large number of pulses per second, we can minimize the initial cost of the diode pumping system. For example, a 1 KW system may require 3 KW average power from the pump diodes, a 20 percent duty factor diode array system would require 15 KW peak power. Using 50 Watt peak bars at $700 per bar, the system would cost $210,000. In comparison, a 1 percent duty factor system would require 300 KW peak power. The cost would be $4,000,000. Increasing the duty factor above 20 percent, all the way to CW is feasible, but, balancing all factors we prefer a duty factor of about 20 percent. Persons skilled in the art will recognize that a flash lamp pumping system could replace the diode pumping system.

The seed beam pulse train frequency could be in the range of 10 MHz to 200 MHz or greater. With some compromise in the average power the number of pulses per second could be reduces down to about 1,000 Hz. High repetition rate mode locked Q-switched systems can be used to generate pulses that are composed of multiple pulses for prepulse applications. The amplifier can be of slab or rod design. The solid state material can be of a host material other than Nd:YAG. For example, Nd:YLF, Cr:LiSAF, Ti:S, etc. could be used. The steering mirror can be any reflecting element that would be appropriate to generate the cluster of spot sizes desired, such as the 20 μm spots.

Other devices could be substituted for the electro-optic modulator for pulse spacing, such as cavity dumping or even an optical rotary interrupter. The pulse spacing devices would in most applications remove a very large percentage of the pulses in the seed beam such as more than 99 percent as in the preferred embodiment described; however, We could imagine applications where as the percentage remove might be as low as 80 percent. The number of passes through the amplifier can be as high as eight. Systems with eight passes are clearly feasible.

Accordingly the reader is requested to determine the scope of the invention by the appended claims and their legal equivalents, and not by the given examples.

We claim:

1. A high average power, high brightness solid state pulse laser device comprising:
   a) a laser means for producing a first pulse laser beam with a high pulse frequency and very short pulse duration of less than 1 ns,
   b) a pulse spacing selector means for removing from said first pulse laser beam more than 80 percent of the pulses in said beam to produce a second pulse laser beam comprising high frequency pulses in excess of 1,000 pulses per second,
   c) a laser amplifier means for amplifying said second pulse laser beam to produce an amplified pulse laser beam comprising high frequency pulses, said amplified pulse laser beam having an average power in excess of 10 Watts,
   d) a focusing means for focusing said amplified pulse laser beam to a small spot size on a target, said spot size being small enough to produce a brightness level in excess of $10^{11}$ W/cm$^2$.

2. A pulse laser device as in claim 1 and further comprising a beam steering means for rapidly steering said amplified pulse laser beam relative to said target so as to simulate a spot size larger than said small spot.

3. A pulse laser device as in claim 2 wherein said beam steering means comprises a PZT device attached to a mirror.

4. A pulse laser device as in claim 1 wherein said beam steering means comprises a means for moving said target relative to said amplified pulse laser beam.

5. A pulse laser device as in claim 1 wherein laser means comprises a mode locked laser oscillator comprising a mode locking means for causing said laser means to produce said first pulse laser beam.

6. A pulse laser device as in claim 5 wherein said mode locking means is an acousto-optic mode locker.

7. A pulse laser device as in claim 1 where in said pulse selector means comprises an electro-optic modulator.

8. A pulse laser device as in claim 1 wherein said laser amplifier means comprises a two-pass Nd:YAG laser amplifier pumped by a pumping means.

9. A pulse laser device as in claim 8 wherein said pumping means comprises a plurality of laser diode arrays.

10. A pulse laser device as in claim 8 wherein said pumping means comprises a flash lamp.

11. A pulse laser device as in claim 1 wherein said laser means comprises a Nd:YAG polished rod pumped by a plurality of laser diode arrays.

12. A pulse laser device as in claim 11 wherein said laser diode arrays are programmed to operate in CW.

13. A pulse laser device as in claim 11 wherein said plurality of laser diode arrays are programmed to operate at a duty factor of less than 100 percent.

14. A pulse laser device as in claim 13 wherein said duty factor is about 20 percent.

15. A pulse laser device as in claim 14 wherein said amplified pulse laser beam comprises a series of periodically spaced high frequency pulses.

16. A pulse laser device as in claim 1, and further comprising a target for the production of X-rays upon illumination at said small spots.

17. A pulse laser device as in claim 16 wherein said target is comprised of a metal.

18. A pulse laser device as in claim 17 wherein said metals is chosen from a group comprised of copper and iron.

19. A pulse laser device as in claim 1 and further comprising a frequency increasing means placed in the amplified beam for increasing the frequency of the amplified beam.

20. A pulse laser device as in claim 19 wherein said frequency increasing means is a harmonic generator.

21. A high average power, high brightness solid state pulse laser device comprising:
 a) a mode locked Nd:YAG laser oscillator for producing a first pulse laser beam with a high pulse frequency,
 b) a pulse spacing selector means for removing from said first pulse laser beam more than 80 percent of the pulses in said beam to produce a second pulse laser beam comprising a series of periodically spaced high frequency pulses in excess of 1,000 pulses per second,
 c) a two-pass, diode pumped, Nd:YAG laser amplifier means for amplifying said expanded pulse laser beam to produce an amplified pulse laser beam with an average power in the range of about 1 KW, said beam comprising high frequency pulses,
 e) a focusing means for focusing said amplified pulse laser beam to a small spot size on a target, said spot size being small enough to produce a brightness level in excess of $10^{11}$ W/cm$^2$.

22. A pulse laser device as in claim 21 and further comprising a beam steering means for rapidly steering said amplified pulse laser beam relative to said target so as to simulate a spot size larger than said small spot.

* * * * *